(12) United States Patent
Yang et al.

(10) Patent No.: US 8,319,855 B2
(45) Date of Patent: Nov. 27, 2012

(54) METHOD, APPARATUS AND SYSTEM FOR IMAGE ACQUISITION AND CONVERSION

(75) Inventors: Feng Yang, Lausanne (CH); Yue Lu, Ecublens (CH); Martin Vetterli, Grandvaux (CH)

(73) Assignee: Rambus Inc., Sunnvyale, CA (US)

( * ) Notice: Subject to any disclaimer, the term of this patent is extended or adjusted under 35 U.S.C. 154(b) by 259 days.

(21) Appl. No.: 12/831,712

(22) Filed: Jul. 7, 2010

(65) Prior Publication Data
US 2011/0176019 A1   Jul. 21, 2011

Related U.S. Application Data

(60) Provisional application No. 61/296,213, filed on Jan. 19, 2010, provisional application No. 61/302,638, filed on Feb. 9, 2010.

(51) Int. Cl.
*H04N 5/228* (2006.01)

(52) U.S. Cl. .................. 348/222.1; 382/276

(58) Field of Classification Search ........... 348/207.99, 348/222.1, 272, 273, 281, 302, 308; 250/208.1, 250/214 R, 226; 257/432, 438; 382/190, 382/276; 356/222
See application file for complete search history.

(56) References Cited

U.S. PATENT DOCUMENTS

| | | | |
|---|---|---|---|
| 4,737,447 A | 4/1988 | Suzuki et al. | |
| 2004/0245592 A1* | 12/2004 | Harmon et al. | 257/438 |
| 2005/0012033 A1* | 1/2005 | Stern et al. | 250/214 R |
| 2005/0151866 A1 | 7/2005 | Ando et al. | |
| 2007/0031140 A1 | 2/2007 | Biernath et al. | |
| 2007/0206241 A1 | 9/2007 | Smith et al. | |
| 2008/0074505 A1 | 3/2008 | Ryde et al. | |
| 2008/0080028 A1 | 4/2008 | Bakin et al. | |
| 2009/0251581 A1* | 10/2009 | Cha et al. | 348/308 |
| 2010/0252716 A1* | 10/2010 | Kalevo et al. | 250/208.1 |
| 2010/0320368 A1* | 12/2010 | Koskinen et al. | 250/226 |
| 2010/0320369 A1* | 12/2010 | Koskinen et al. | 250/226 |
| 2010/0321542 A1* | 12/2010 | Koskinen et al. | 348/273 |

(Continued)

FOREIGN PATENT DOCUMENTS
WO   2009136989 A1   11/2009

OTHER PUBLICATIONS

Sbaiz et al., "The Gigavision Camera", IEEE Internation Conference on Acoustics, Speech and Signal Processing, Apr. 2009, pp. 1093-1096.*

(Continued)

*Primary Examiner* — Nelson D. Hernández Hernández
*Assistant Examiner* — Dennis Hogue
(74) *Attorney, Agent, or Firm* — Charles Shemwell

(57) ABSTRACT

A method for image acquisition and conversion includes low-pass filtering an image by an acquisition lens, producing from the low-pass filtered image, an up-sampled image with a first resolution with an up-sampling factor using a image sensor. The up-sampled image is converted into a multi-level image with a second resolution lower than the first resolution with an image processing circuit. The converting depends on the low-pass filtering of the lens and on the up-sampling factor. The method is adapted to gigapixel sensors and convention image sensors.

23 Claims, 13 Drawing Sheets

U.S. PATENT DOCUMENTS

| | | | | |
|---|---|---|---|---|
| 2010/0328504 | A1* | 12/2010 | Nikula et al. | 348/273 |
| 2010/0329566 | A1* | 12/2010 | Nikula et al. | 382/190 |
| 2011/0121421 | A1* | 5/2011 | Charbon et al. | 257/432 |
| 2011/0149274 | A1* | 6/2011 | Rissa et al. | 356/222 |

OTHER PUBLICATIONS

Yang et al., "Image Reconstruction in the Gigavision Camera", ICCV workshop OMNIVIS 2009, 2009.*

Fossum, "What to Do With Sub-diffraction-limit (SDL) Pixels?—A Proposal for a Gigapixel Digital Film Sensor (DFS)", IEEE Workshop on Charge-coupled Devices and Advanced Image Sensors, Jun. 2005, pp. 1-4.*

L. Sbaiz, F. Yang, E. Charbon, S. Sustrunk, and M. Vetterli, The gigavision camera, IEEE International Conference on Acoustics, Speech and Signal Processing, Apr. 2009, pp. 1093-1096.

E. R. Rossum, What to do with sub-diffraction-Limit (SDL) Pixels?—A proposal for a Gigapixel Digital Film Sensor (DFS), IEEE Workshop on Charge-Coupled Devices and Advanced Image Sensors, Jun. 2005, pp. 1-4.

E. R. Fossum, Gigapixel Digital Film Sensor, Nanospace Manipulation of Photons and Electrons for Nanovision Systems, The 7th Takayanagi Kenjiro Memorial Symposium and the 2nd International Symposium on Nanovision Science, Oct. 2005, pp. 1-5.

* cited by examiner $k$ k

METHOD, APPARATUS AND SYSTEM FOR IMAGE ACQUISITION AND CONVERSION

REFERENCE DATA

This application claims priority of US2010/61296213, filed on Jan. 19, 2010 and of US2010/61302638, filed on Feb. 9, 2010, the contents whereof are hereby incorporated.

FIELD OF THE INVENTION

The present invention concerns a method for image acquisition and conversion. The present invention concerns also an image acquisition apparatus and a computer-program product.

DESCRIPTION OF RELATED ART

A simplified architecture of a camera or other imaging system is shown on FIG. 1a. The camera comprises a lens 1 that focuses the incident light onto the plane of an image sensor 2 comprising a plurality of pixels 20 in a row or in an array. Each pixel 20 in the image sensor collects photons, and converts them to analog electrical signals, which are then quantized by a quantizer, such as an A/D converter, into 1, 8 or 12 bits for example. The number of photons hitting the pixel can be modeled by a Poisson process. The quantizers can be provided in each pixel or in a read-out circuit shared by a plurality of pixels.

The image sensor can be considered as a sampling device, which samples the integration function of the light intensity field during a given exposure time and over a space region. One of the most important parameter in a camera is the size of the pixels, which determines the spatial sampling interval.

Due to the diffraction limit, Rayleigh criterion gives the minimum spatial resolution of an ideal lens. The impulse response of the lens 1 is a point spread function (PSF), P(x) shown in FIG. 2. Because the lens has aberrations, and because there is diffraction even with an ideal lens, the point spread function is not a Dirac delta function; instead, the lens acts as a low-pass filter with a minimum spatial resolution larger than zero.

A model of the lens is shown as example in FIG. 3. The light intensity field before the lens is λ(x), where x denotes space index. Due to the low-pass effect of the lens, the light intensity field after the lens is bandlimited and equal to λ(x)*P(x), (* being the convolution operator).

Thanks to the scaling effects in CMOS technology, the state of the art pixel size used in consumer camera and other imaging equipments is often smaller than the minimum spatial resolution of the lens. In this case, the image sensor acts as an oversampling device and produces more samples than what would be required by the bandwidth of the image signal after bandlimitation by the lens.

Moreover, so-called gigapixel camera (or gigapixel digital film) are also known in which a massive oversampling factor is used. The image sensor of gigapixel camera have a non-linear response, similar to a logarithmic function, which make them very suitable for acquiring high dynamic range scenes. Moreover, gigapixel cameras usually have a single photon detector at each pixel, which reduce exposure time in low light conditions, due to the highly sensitive photon detection mechanism. Gigavision cameras can be used for taking videos or photos or, in general, any kind of image, including for example medical images using X-rays or other wavelengths instead of light.

Usually, the pixels in a gigapixel camera have a I-bit quantizer for converting the output of each pixel into binary values (black or white). The image output by the gigapixel sensor thus has a very high spatial resolution but only 2 levels at each pixels, for example only two grey levels. Therefore, a processing circuit is required in order to convert the high resolution, binary output of the gigapixel sensor into an image signal with a lower resolution but with more grey levels.

According to one aspect, the present invention thus relates to image conversion, in particular to methods for the reconstruction of an estimate of a multilevel image based on an oversampled digital signal. In some embodiments, the present invention relates to the conversion of a high resolution binary image signal into a lower resolution multilevel signals. In another embodiments, the present invention also relates to the conversion of a multilevel image signal into another signal with a different number of levels at each or some pixels, and/or with a different resolution. All embodiments can be used for the conversion of 1D, 2D or N-D image signals output by any image sensor.

FIG. 4 illustrates schematically an image sensor 2. The effect of this sensor is to sample the incoming light that passes through the lens 1. The number of electrons $S_k$ generated by the kth pixel depends on the number of photons impinging on this pixel. For example, if the quantum efficiency of the pixel is '1', the number of electrons generated by a pixel 20 is equal to the number of photons received by this pixel.

During an exposure time $\tau$, and pixel width $\Delta x$, the number of electrons $S_k$ generated by the kth pixel obeys a Poisson distribution with parameters $\tilde{\lambda}_k$ which is the average number of electrons generated by the pixel during the exposure time. This distribution can be written as:

$$P[S_k = i] = e^{-\tilde{\lambda}_k} \frac{\tilde{\lambda}_k^i}{i!}$$

As illustrated on FIG. 4, the value delivered by the image sensor 2 is a convolution of the signal after the lens λ(x)*P(x) with a kernel function $f(x)$, followed by a sampling of the resulting function $\tilde{\lambda}(x)$ at $$x = \frac{x_{k-1} + x_k}{2}.$$

A quantizer is then used to quantize the number of electrons and produces a pixel value $B_k$ which is also a random variable:

$$\begin{cases} \mathbb{P}[B_k = 0] = \sum_{i=0}^{Q_1-1} e^{-\tilde{\lambda}_k} \frac{\tilde{\lambda}_k^i}{i!} \\ \mathbb{P}[B_k = 1] = \sum_{i=Q_1}^{Q_2-1} e^{-\tilde{\lambda}_k} \frac{\tilde{\lambda}_k^i}{i!} \\ \ldots \\ \mathbb{P}[B_k = L-1] = \sum_{i=Q_{L-1}}^{+\infty} e^{-\tilde{\lambda}_k} \frac{\tilde{\lambda}_k^i}{i!}, \end{cases}$$

$k = 1, 2, \ldots, K.$

The starting position of the $k_{th}$ pixel is $x_{k-1}$, and the ending position is $x_k$. Therefore, the estimation $\tilde{\lambda}_k$ of the light received by the pixel is:

$$\tilde{\lambda}_k = \int_{x_{k-1}}^{x_k} \tau\lambda(x) * P(x) dx = \tau\lambda(x) * P(x) * f(x) * \delta\left(x - \frac{x_{k-1} + x_k}{2}\right),$$

After quantization, the image sensor 2 produces a set of numerical values $B=[B_1, B_2, \ldots, B_K]^T$, $b=[b_1, b_2, \ldots, b_K]^T$ is a realization of the random variable B.

One aim of the present invention is thus to produce an estimate of the light intensity field $\tilde{\lambda}(x)$, given those quantized pixel value.

In particular, it is an aim of the present invention to retrieve the light intensity field $\tilde{\lambda}(x)$ based on the output of an oversampling image sensor, i.e., an image sensor with a spatial and/or temporal frequency larger than the Nyquist rate of $\tilde{\lambda}(x)$ In the special case of a gigapixel sensor, an aim of the invention is to reconstruct a conventional image (with grey levels) using the binary, higher resolution image output by the sensor.

Reconstruction methods for reconstructing an image from quantized measurements taken by an oversampling camera, such as a gigapixel camera, are known in the prior art. For example, it is known to add or average signals delivered by adjacent pixels in blocks. In the case of a gigapixel camera, it has been suggested for example to produce a multivalued signal that indicates grey levels by summing the binary values B within blocks of adjacent pixels. Other methods based on a low-pass filtering and downsampling the output of the image sensor are also known. This processing is usually done in the readout circuit of the image sensor, or could be done by any digital image processing system in the camera or in a computer or other processing system that receives and process the captured images.

A problem of this prior art approach is that the performance of reconstructing images by low-pass filtering and down-sampling is not good, or at least not optimal.

One difficulty in prior art image sensor is to determine the thresholds $Q_1$ used by the quantizer to distinguish between levels. For example, when the light intensity is high, a gigapixel camera with a large threshold $Q_1$ works better than one with a small threshold. When the light intensity is small, a gigavision camera with a small threshold $Q_1$ works better than one with a large threshold. The same difficulties apply also with image sensors producing multilevel images.

Therefore, there is a need for an improved image acquisition and reconstruction method and apparatus that deliver a better quality of image and that produce a better estimate of the incoming light field based on quantized values generated by the image sensor.

There is also a need to improve the speed of the reconstruction algorithm for reconstructing an image from quantized measurements taken by the camera.

There is also a need for a reconstruction method where the computing complexity does not significantly increase when an image is captured under multiple exposures or with massive spatial oversampling.

BRIEF SUMMARY OF THE INVENTION

The reconstruction method and apparatus of the invention is based in part on novel uses of the sampling theory. This theory tells us that we can perfectly reconstruct an estimated light intensity field $\tilde{\lambda}(x)$ from samples $\gamma_j$, $j=1, 2, \ldots, J$ at Nyquist rate:

$$\tilde{\lambda}(x) = \sum_{j=1}^{J} \gamma_j \phi(x - x_j),$$

where $\gamma_j$, $j=1, 2, \ldots, J$ are samples of the estimated light intensity field $\tilde{\lambda}(x)$ at Nyquist rate, $\phi(x)$ is a kernel function, and $x_j$ is the sampling position for the jth pixel. The oversampling rate is $$N = \frac{K}{J}.$$

Taking into account the sampling position $x_k$, $k=1, 2, \ldots, K$, the previous expression can be written in digital form as:

$$\tilde{\lambda}_k \approx \sum_{j=1}^{J} \gamma_j \phi_N(x_k - x_j).$$

We use the symbol "≈" in the above equation since the kernel function is often not the ideal one, but only an approximation, based on the assumption that when the pixel size Δx is changed by a factor N, the kernel function needs only to be changed by this scaling factor.

Therefore, according to an aspect of the invention, the above mentioned aims are achieved by means of a method where the conversion of the image signal is not just a series of low-pass filtering and downsampling operations as in the prior art; instead, this conversion is considered as a reconstruction of a signal from digital samples values, for example reconstruction of a signal from digital values taken at a sampling rate above the Nyquist rate, and taking into account properties of the whole optical and electronic system, in particular properties of the lens.

The above mentioned aims are also achieved by means of a method for image acquisition and conversion comprising
    low-pass filtering (or more generally transforming with a transfer function) an image by an acquisition lens,
    producing from said low-pass filtered image an up-sampled image with a first resolution with an up-sampling factor using a image sensor,
    converting said up-sampled image into a multi-level image with a second resolution lower than said first resolution with an image processing circuit
    wherein said converting step depends on said low-pass filtering of said lens and on said up-sampling factor.

The reconstruction depends on the transfer function of the lens and on the oversampling factor, thus resulting in an optimization of the whole system and in an improved image quality.

The output delivered by the reconstruction process is typically a multi-level image, i.e., an image with more than two different possible values at each pixel, such as a grayscale or color image.

In one embodiment, the up-sampled image is produced with a gigapixel image sensor that outputs a binary up-sampled image.

In one embodiment, the sensor quantizer comprises a spatially-varying arrangement. For example, in the 1-bit quantizer case, one group of pixels on the sensor could have a threshold $Q_1=1$, and the rest of the pixels a higher threshold, or various different thresholds.

Advantageously, the conversion into a multi-level image is done with a method and circuit that implements a maximum likelihood estimation method.

According to one aspect, the invention is based on the finding that the negative log-likelihood function is a convex function; this is true in particular when the threshold Q of the quantizer is "1", but also when the threshold is different from "1", and with quantizers having a plurality of thresholds for producing multilevel measurement values B. Therefore, optimal solution can be achieved using convex optimization.

In one embodiment, at least two exposures are provided for each image acquired, thus resulting in temporal oversampling and in even more samples used for each image. Methods are described that allow using multiple exposure without substantial increase of the computational complexity.

According to an aspect, the reconstruction method uses a maximum likelihood method based on filter bank techniques for computing the gradient and the multiplication of a vector and Hessian matrix of the negative log-likelihood function. The use of filter bank techniques results in fast processing.

Advantageously, a polyphase representation or another improved representation of the signals and operators is used in order to increase the computing speed.

An important advantage of the method according to the invention is to allow a reconstruction of an image exploiting and depending on the low-pass filtering function of the lens and the up-sampling function of the gigavision sensor.

Advantageously, the reconstruction of the image from the measurements output by the sensor can be done by DSP elements, by FPGA components, by a microprocessor or microcontroller inside a camera or in a computer. For example, the maximum likelihood estimation used within the method can be carried out by means among this list, or by any other suitable hardware or software means.

For this purpose, a program of image elaboration during the treatment of image takes into account the sensor and the lens of the camera. In another embodiment, the reconstruction is done by an image processing apparatus outside of the camera, for example by an image processing software executed by a computer or IT equipment that receives and processes image files output by the camera. The invention also relates to a computer program product that tangibly and permanently stores a computer program for causing a processing system to perform the method described in this application.

BRIEF DESCRIPTION OF THE DRAWINGS

The invention will be better understood with the aid of the description of an embodiment given by way of example and illustrated by the Figures, in which.

In another embodiment, the quantizer is an L-level quantizer 4 with a plurality of levels $Q_1, Q_2, \ldots, Q_{L-1}$; the thresholds between the levels can be equidistant or not, and the quantized produces multilevel pixel values $B_k$, $k=1, 2, \ldots, K$ indicating level of grays for each of the K pixels. As will be described later, different quantizers with different number of thresholds, and/or with different distances between the thresholds, can be associated with one single image sensor.

Figure 1A:
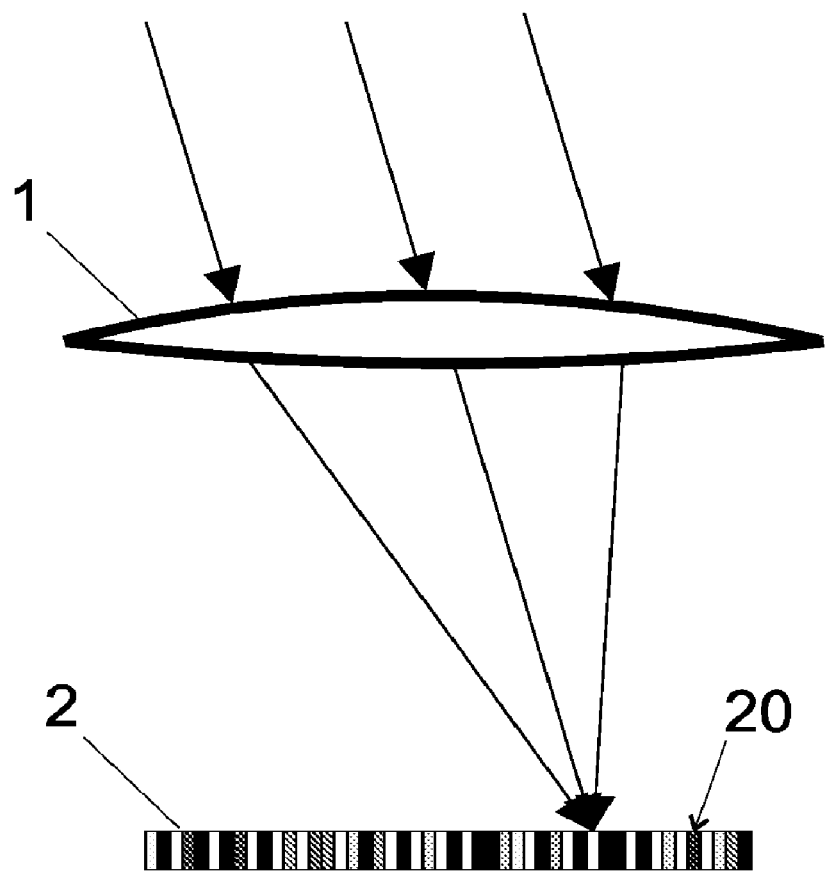
FIG. 1a shows a simplified architecture of a camera. The incident light is focused by the lens and then impinges on the image sensor. After that, each pixel in the image sensor converts the received photons to electrons.
Figure 1B:
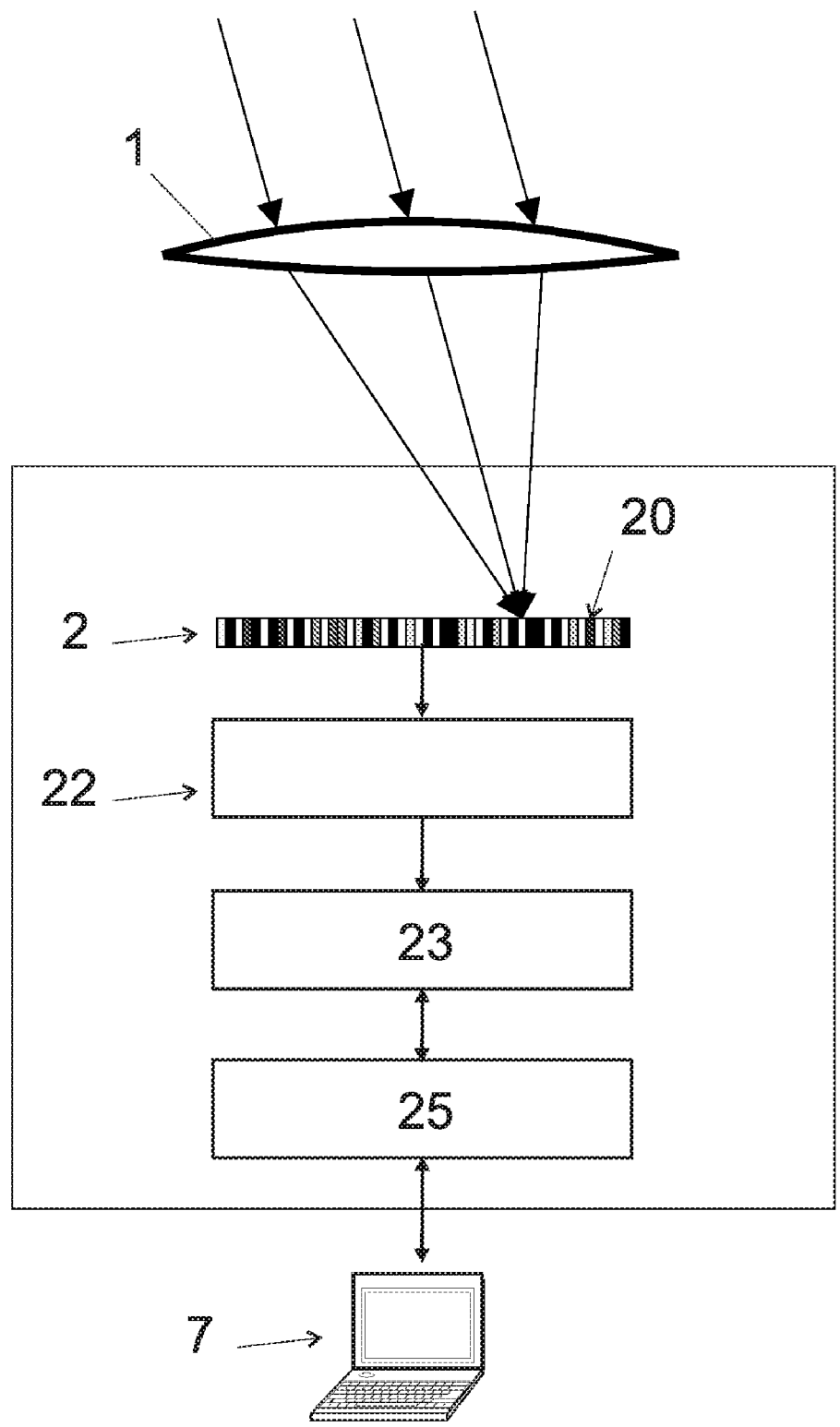
FIG. 1b shows a simplified architecture of an image acquisition apparatus comprising a camera and additional image processing means.
Figure 2:
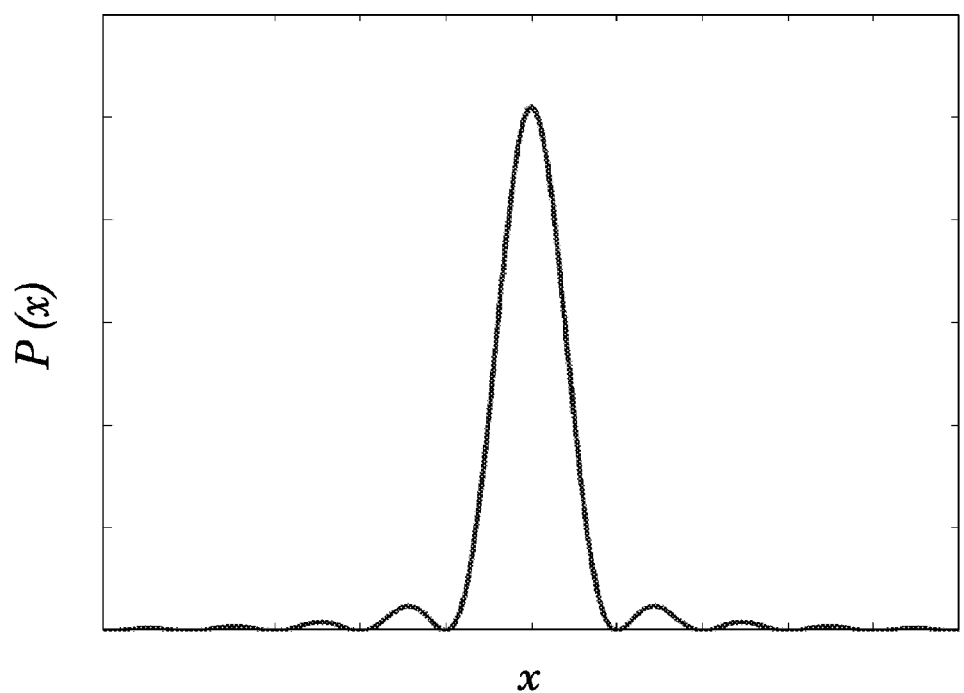
FIG. 2 shows an example of point spread function of the lens.
Figure 3:
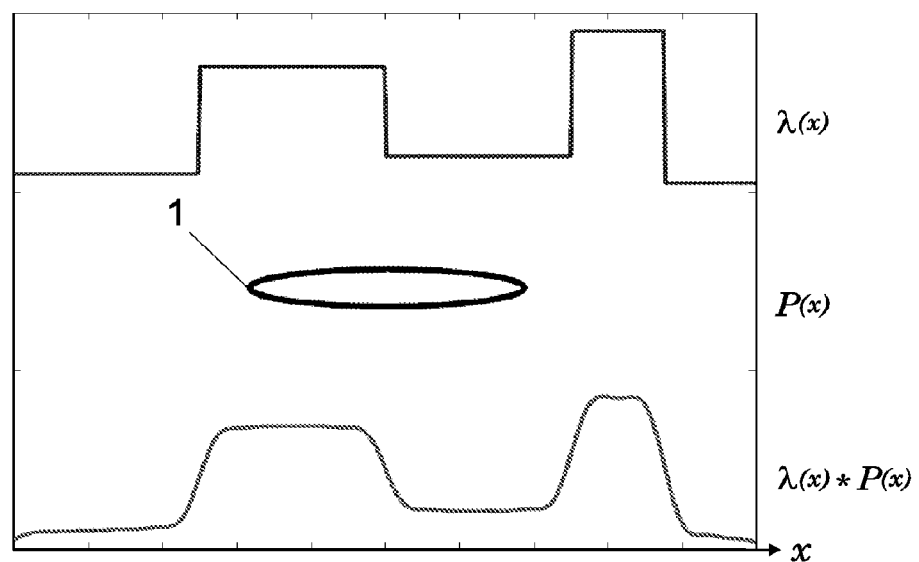
FIG. 3 shows the model of the lens. The lens is modeled as a linear system with impulse response P(x). The result of a light intensity field $\lambda(x)$ passing through the lens is $\lambda(x)*P(x)$.
Figure 4:
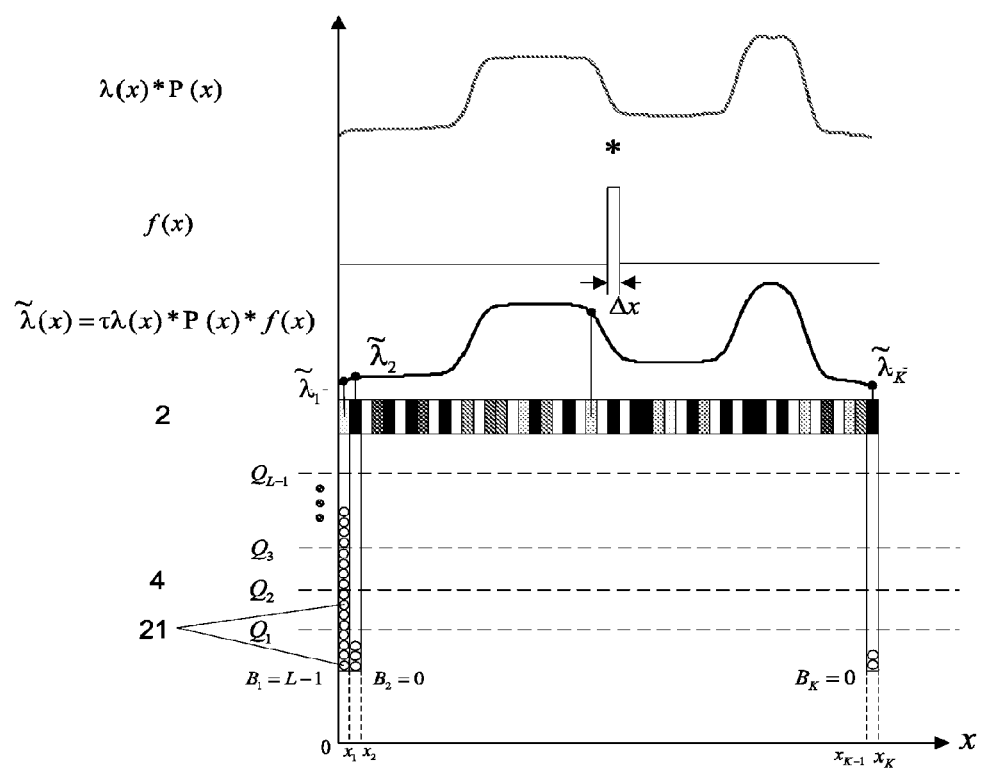
FIG. 4 shows a model of the image sensor using an L-level quantizer with levels, $Q_1, Q_2, \ldots, Q_{L-1}$ to quantize the number of electrons and to produce the pixel values $B_k$, $k=1, 2, \ldots, K$.

Reference 23 on FIG. 1b shows a processing circuit for processing the quantized pixel value B delivered by the quantizer(s) 22. The processing circuit may be built around a microprocessor, a microcontroller, a digital processing circuit, a FPGA, an asic, etc. The processing circuit is connected to a memory, for example a semi permanent memory 25 such as a Flash memory for example, for storing software executed by the processing circuit (bios) and processed images delivered by the processing circuit 23. The processing circuit executes program or functions for converting the image signals delivered by the image sensor 22 into lower-resolution image files, using reconstruction methods described below. Those reconstruction methods can also be executed, entirely or in part, by programs executed outside of the camera, for example in a personal computer 7, workstation, server or any other IT system able to receive and process oversample samples produced by the image sensor.

Since the reconstruction depends on the transfer function of the lens and on the oversampling factor used by the image sensor, those parameter need to be known by the processing circuit 23 that perform the reconstruction. If the lens is not integral with this processing circuit, the type of lens which is used, or its transfer function, can be indicated as metadata in the image file, or input by the user, or retrieved from a knowledge database for instance or a priori known. The oversampling factor can usually be retrieved from the image files, for example by determining the number of samples b.

Figure 5:
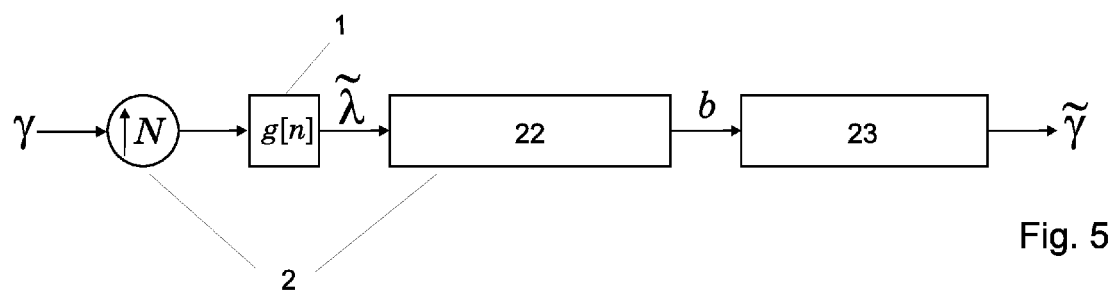
FIG. 5 shows a example of model for the camera of the invention. $\gamma=[\gamma_1, \gamma_2, \ldots, \gamma_J]^T$ are the samples of $\tilde{\lambda}(x)$ at Nyquist rate. N is upsampling factor. g[n] is a low-pass filter. $\hat{\lambda}=[\hat{\lambda}_1, \hat{\lambda}_2, \ldots, \hat{\lambda}_K]^T$ are oversampled samples of $\tilde{\lambda}(x)$. $B=[B_1, B_2, \ldots, B_K]^T$ are the quantized pixel values, $b=[b_1, b_2, \ldots, b_K]^T$ is a realization of B. $\hat{\gamma}=[\hat{\gamma}_1, \hat{\gamma}_2, \ldots, \hat{\gamma}_J]^T$ are the reconstructed values of $\tilde{\lambda}(x)$.
Figure 6:
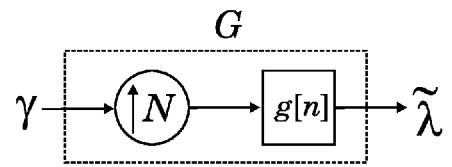
FIG. 6 shows the upsampling and low-pass filtering operator G.

FIG. 5 is another block diagram of the apparatus of the invention. The light intensity field $\gamma=[\gamma_1, \gamma_2, \ldots, \gamma_J]^T$ is spatially (and/or temporally) upsampled by a factor N by the camera sensor 2 and filtered by a low-pass filter g[n] corresponding to the lens 1, thus producing oversampled samples of $\tilde{\lambda}(x)$, $\tilde{\lambda}=[\tilde{\lambda}_1, \tilde{\lambda}_2, \ldots, \tilde{\lambda}_K]^T$. The relation between the light intensity field $\tilde{\lambda}$ at the output of the image sensor and the light intensity field $\gamma$ before the lens can be written as $\tilde{\lambda}=G\gamma$, where $G=[g_1, g_2, \ldots, g_K]^T$ is a K×J matrix representing the upsampling and low-pass filtering operator, as shown in FIG. 6.

A quantized pixel value B is then generated by the quantizers 22. Finally a reconstruction algorithm is executed by digital processing means 23 in the camera or in a digital processing system to obtain an estimate of the light intensity field $\hat{\gamma}=[\hat{\gamma}_1, \hat{\gamma}_2, \ldots, \hat{\gamma}_J]^T$.

The aim of the reconstruction is to compute the estimate $\hat{\gamma}$ of the light intensity field. According to one aspect of the invention, the reconstruction method carried out by the digital processing means 23 uses a maximum likelihood estimator (MLE), or other maximum likelihood estimating means, for solving the reconstruction problem and for computing $\hat{\gamma}$:

$$\hat{\gamma} = \underset{\gamma}{\operatorname{argmax}} \mathbb{P}(B; \gamma)$$

$$\stackrel{(1)}{=} \underset{\gamma}{\operatorname{argmax}} \prod_{k=1}^{K} \sum_{l=0}^{L-1} \delta(B_k - l) \mathbb{P}(B_k = l; \tilde{\lambda}_k)$$

$$\stackrel{(2)}{=} \underset{\gamma}{\operatorname{argmax}} \ln \left( \prod_{k=1}^{K} \sum_{l=0}^{L-1} \delta(B_k - l) \mathbb{P}(B_k = l; \tilde{\lambda}_k) \right)$$

$$\stackrel{(3)}{=} \underset{\gamma}{\operatorname{argmin}} - \sum_{k=1}^{K} \ln \left( \sum_{l=0}^{L-1} \delta(B_k - l) \mathbb{P}(B_k = l; \tilde{\lambda}_k) \right)$$

$$= \underset{\gamma}{\operatorname{argmin}} \mathcal{L}(\gamma)$$

Those relations are based on the following findings: in (1), we use the independence of each pixel when given $\gamma_k$, in (2) we use the fact that the logarithm function ln does not change the solution of a maximization problem, and in (3) we use the property that the solution of maximizing a function is equal to minimize the corresponding negative function.

For each pixel k, the negative log-likelihood function $L(\gamma)$ can be written as $$L_k(\gamma) = -\ln \left( \sum_{l=0}^{L-1} \delta(B_k - l) P(B_k = l; \tilde{\lambda}_k) \right), \text{ then } L(\gamma) = \sum_{k=1}^{K} L_k(\gamma).$$

It can be demonstrated that $L(\gamma)$ is a convex function, even if the quantizer is a multi-level quantizer. A demonstration can be found in the Appendix.

In addition to or instead of the spatial oversampling, it is also possible to perform a temporal oversampling by taking M pictures during each time period $[0,\tau]$. In this example, all pictures are taken with the same exposure time $$\frac{\tau}{M};$$

different exposure times can also be considered.

Let $\tilde{\lambda}$ (x) be the new parameter function for the image sensor, then $$\tilde{\tilde{\lambda}}(x) = \frac{\tilde{\lambda}(x)}{M} = \frac{\tau}{M} \lambda(x) * P(x) * f(x),$$

which is the same for each exposure. So we scale down the original parameter function by a factor of M. Then $$\tilde{\gamma} = \frac{\gamma}{M}, \text{ and } \tilde{\tilde{\lambda}} = \left[ \tilde{\tilde{\lambda}}_1, \tilde{\tilde{\lambda}}_2, \ldots, \tilde{\tilde{\lambda}}_k \right]^T = \frac{\tilde{\lambda}}{M}.$$

Let $\tilde{B}[B_1, B_2, \ldots, B_M]$, where $B_m=[B_{m1}, B_{m2}, \ldots, B_{mK}]^T$, $m=1, 2, \ldots, M$ is the output pixel values during mth exposure, and $B_{mk}$, $k=1, 2, \ldots, K$ is the pixel value of kth pixel, during the $m^{th}$ exposure. The maximum likelihood estimator (MLE) to estimate $\gamma$ is $$\hat{\gamma} = \underset{\gamma}{\operatorname{argmax}} \mathbb{P}(\tilde{B}; \gamma)$$

$$\stackrel{(1)}{=} \underset{\gamma}{\operatorname{argmax}} \sum_{m=1}^{M} \sum_{k=1}^{K} \sum_{l=0}^{L-1} \delta(B_{mk} - l) \mathbb{P}\left(B_{mk} = l; \tilde{\tilde{\lambda}}_k\right)$$

$$= \underset{\gamma}{\operatorname{argmax}} \sum_{m=1}^{M} \sum_{k=1}^{K} \sum_{l=0}^{L-1} \delta(B_{mk} - l) \mathbb{P}\left(B_{mk} = l; \frac{\tilde{\lambda}_k}{M}\right)$$

$$\stackrel{(2)}{=} \underset{\gamma}{\operatorname{argmax}} \ln \left( \sum_{m=1}^{M} \sum_{k=1}^{K} \sum_{l=0}^{L-1} \delta(B_{mk} - l) \mathbb{P}\left(B_{mk} = l; \frac{\tilde{\lambda}_k}{M}\right) \right)$$

$$\stackrel{(3)}{=} \underset{\gamma}{\operatorname{argmin}} - \sum_{m=1}^{M} \sum_{k=1}^{K} \ln \left( \sum_{l=0}^{L-1} \delta(B_{mk} - l) \mathbb{P}\left(B_{mk} = l; \frac{\tilde{\lambda}_k}{M}\right) \right),$$

The estimator thus uses the following findings: in (1), the relation is based on the independence of each pixel when given $\lambda_k$, in (2) the estimator uses the fact that ln does not change the solution of a maximization problem, and in (3) the estimator uses use the property that the solution of maximizing a function is equal to minimize the corresponding negative function.

Thus, according to previous equation, $$\hat{\gamma} = \underset{\gamma}{\operatorname{argmin}} \tilde{L}(\gamma),$$

where $\tilde{L}(\gamma)$ is the negative log-likelihood function, $$\tilde{L}(\gamma) = - \sum_{m=1}^{M} \sum_{k=1}^{K} \ln \left( \sum_{l=0}^{L-1} \delta(B_{mk} - l) P\left(B_{mk} = l: \frac{\tilde{\lambda}_k}{M}\right) \right), \gamma \in R_+^J.$$

Let $\tilde{L}_{mk}(\gamma) = -\ln \left( \sum_{l=0}^{L-1} \delta(B_{mk} - l) P\left(B_{mk} = l; \frac{\tilde{\lambda}_k}{M}\right) \right)$, then -continued $$\tilde{L}(\gamma) = \sum_{m=1}^{M} \sum_{k=1}^{K} \tilde{L}_{mk}(\gamma).$$

In multiple successive exposures, as in the case of single exposure, it can be demonstrated that $\tilde{L}(\gamma)$ is a convex function. (see Appendix). Therefore, since the negative log-likelihood function is a convex function, the estimator can use any method for solving a convex optimization problem, like interior-point method, trust-region method, or Newton's method for example. Advantageously, the method is selected so as to reduce the computing time and power required to find the solution.

In one embodiment, the estimator uses the following modified Newton's method for estimating the incoming light in the one exposure case. The one skilled in the art can adapt this method to the multiple exposures case. A possible pseudo codes is as follows:

```
Pseudocode for Modified Newton's method
given a starting point γ₀ ∈ domℒ(γ), domℒ(γ)
is the domain of function ℒ(γ), tolerance ε = 10⁻⁵.
repeat
  1. Compute the Newton step and decrement.
     Calculate ∇ℒ(γ), quit if ||∇ℒ(γ)|| · ε
     Δγ := -∇²ℒ(γ)⁻¹∇ℒ(γ);
     θ² := -∇ℒ(γ)ᵞ Δγ, quit if θ²/2 · ε.
  2. Line search.
     Choose step size φ by backtracking line search.
     given a descent direction Δγ for ℒ(γ)
     α = 0.25, β = 0.5, φ := 1,
     while γ + φΔγ ∉ domL(γ),
       if φ < 10⁻⁵, find position set I,
         that γᵢ ≧ γmin or γᵢ · γmax, i ∈ I
           if I is not empty, Δγⱼ = 0, j ∈ 𝒥 − I
             where 𝒥 = {1,2, . . . ,𝒥}.
           else quit.
         else φ := βφ
     while ℒ(γ + φΔγ) > ℒ(γ) + αφ∇ℒΔγ, φ := βφ
  3. Update. γ := γ + φΔγ.
```

A problem is that the size of the Hessian matrix $\nabla^2 L(\gamma)$ is very large, so that computing the inverse of this matrix requires a lot of processing power and processing time. According to one aspect, in order to reduce this computing time, the system is programmed so as to perform a conjugate gradients method and directly compute $\nabla^2 L(\gamma)^{-1} \nabla L(\gamma)$.

In most known methods for solving convex optimization problem, like the Newton's method, the interior-point method or the trust-region method, it is needed to provide the negative log-likelihood function's gradient, and the Hessian matrix multiplication with a vector.

The method used in the method of the invention is also based on the finding that the gradient of the negative log-likelihood function $$L(\gamma) \text{ is } \nabla L(\gamma) = G^T \left[ \frac{\partial L_1(\gamma)}{\partial \tilde{\lambda}_1}, \frac{\partial L_2(\gamma)}{\partial \tilde{\lambda}_2}, \ldots, \frac{\partial L_K(\gamma)}{\partial \tilde{\lambda}_K} \right]^T,$$

and the Hessian matrix of $L(\gamma)$ is $H = G^T A G$, where, $$A = \begin{pmatrix} \frac{\partial^2 \mathcal{L}_1(\gamma)}{\partial^2 \tilde{\lambda}_1} & 0 & \cdots & 0 \\ 0 & \frac{\partial^2 \mathcal{L}_2(\gamma)}{\partial^2 \tilde{\lambda}_2} & \cdots & 0 \\ \vdots & \vdots & \ddots & \vdots \\ 0 & 0 & \cdots & \frac{\partial^2 \mathcal{L}_K(\gamma)}{\partial^2 \tilde{\lambda}_K} \end{pmatrix}.$$

A problem with the above two equations is that if the upsampling factor is large, the matrix G is big and huge storage space would be required to store it.

However, the operator G corresponds to the lens and to the upsampling part of the image sensor, and there is no requirement for storing the whole matrix. We only need to know the parameters of the upsampling and low-pass filtering operator, i.e., the upsampling factor N and the coefficients of the low-pass filter g[n]. The coefficients of the low-pass filter of the lens can be stored in a storage of the lens, and transmitted to the processing means that make the transformation. In another embodiment, those coefficients are a priori known by the processing means, for example if the processing means know in advance the properties of the lens that is used. In yet another embodiment, those properties are retrieved by the processing means based on an identification of the type of lens received by the processing means.

Figure 7:
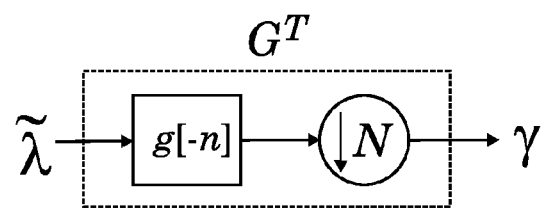
FIG. 7 shows the operator $G^T$ for low-pass filtering and downsampling.

We can write $G = LU$, where L indicates low-pass filtering operator and U denotes upsampling operator. Then $G^T = (LU)^T = U^T L^T = DR$, where D is the matrix notation for downsampling operator and R is the matrix notation for low-pass filtering operator. The downsampling factor of D is equal to the upsampling factor of U. If the filter coefficients of L is g[n], then the filter coefficient of R is g[−n]. In the case of symmetric low-pass filter, the filter coefficients of L and R are the same. FIG. 7 illustrates the matrix for low-pass filtering and downsampling operator $G^T$ The gradient of $L(\gamma)$ can be computed by first low-pass filtering the vector $$\left[ \frac{\partial L_1(\gamma)}{\partial \tilde{\lambda}_1}, \frac{\partial L_2(\gamma)}{\partial \tilde{\lambda}_2}, \ldots, \frac{\partial L_K(\gamma)}{\partial \tilde{\lambda}_K} \right]^T,$$

then downsampling it by the factor N.

Figure 8:
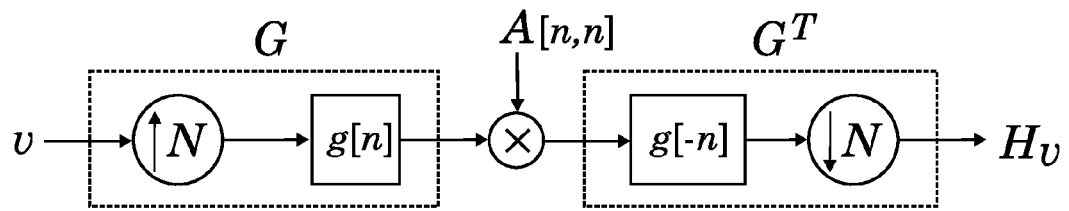
FIG. 8 shows a diagram from computing $L(\gamma)$'s Hessian matrix Hv times a vector v. g[n] and g[−n] are low-pass filters.

The negative log-likelihood function's Hessian matrix H times a vector v is $Hv = G^T A G v$. FIG. 8 shows the diagram for computing the above equation. The vector v is upsampled with upsampling factor N, then low-pass filter it using a filter g[n].

Since the matrix A is a diagonal matrix, the multiplication of A and vector Gv is equal to the elementwise multiplication of the diagonal of A and Gv. After that, the processing means low-pass filters the obtained vector with a filter of g[−n] and downsamples by a factor of N to get Hv.

Therefore, the processing means can reconstruct the image signal from the measured samples.

According to one aspect of the invention, in order to further increase the speed of the optimization process, a polyphase representation can be used to reduce the computing time of the upsampling and low-pass filtering operator. Different polyphase representations can be defined for a sequence and for a filter.

A 1-D sequence x[k] or filter g[k] can be decomposed into N polyphase components, defined as, $$x_i[k] \triangleq x[Nk+i], g_i[k] \triangleq g[Nk-i], i = 0, 1, \ldots, N_i 1.$$

Figure 9:
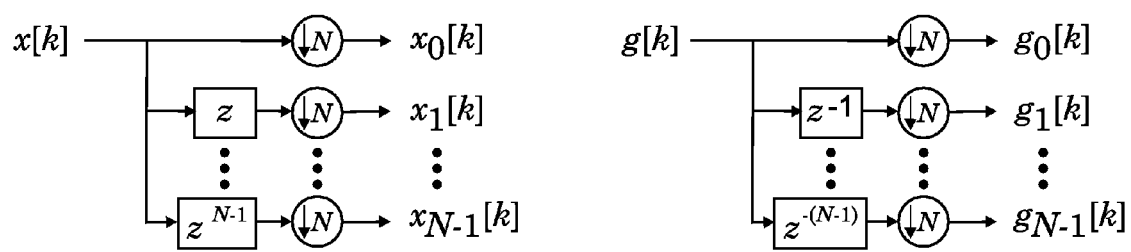
FIG. 9 shows the polyphase representation of a sequence x[k] (left) and a filter g[k] (right).

FIG. 9 schematically illustrates a polyphase representation of a sequence x[k] (left part) and of a filter g[k] (right part). We can also compute this polyphase representation in the z-domain:

$$X(z) = \sum_{n=0}^{N-1} z^{-n} X_n(z^N), \text{ and } G(z) = \sum_{n=0}^{N-1} z^n G_n(z^N).$$

Let Y(z) be the z transform of the sequence y[k], which is the output when we implement the low-pass filtering and downsampling operator on a signal x[k], then we have $$Y(z) = \sum_{n=0}^{N-1} H_n(z) X_n(z).$$

This means that the process for the implementation of the operator on a sequence x[k] is decomposing the filter and sequence into N polyphase components, filtering the nth polyphase component of the sequence separately with the corresponding nth polyphase component of the filter, and summing all the filtered results to generate y[k].

During this process, the processing means avoid to compute the sequence value which will be discarded during the downsampling process, therefore the computing time can be saved.

If g[k] is decomposed using the definition of polyphase representation for a sequence, then $$G(z) = \sum_{n=0}^{N-1} z^{-n} H_n(z^N)$$

and the output of the implementing the upsampling and low-pass filtering operator on x[k] can be written as $$\begin{pmatrix} Y_0(z) \\ Y_1(z) \\ \vdots \\ Y_N(z) \end{pmatrix} = \begin{pmatrix} G_0(z) \\ G_1(z) \\ \vdots \\ G_N(z) \end{pmatrix} X(z),$$

where $Y_n(z)$ is the z transform of the nth polyphase component of the output sequence y[k].

Using this method, the processing means avoid to compute the multiplication of the filter coefficient and the "0"s generated during the upsampling process, and thus increase the speed by a factor of N.

Analysis have also shown that in the 1-bit quantizer case, a lower threshold $Q_1$ leads to small estimation errors in low light situations, but does not perform well in high light intensity regions, for which a higher threshold is more suitable.

To address the problem of a suitable threshold, in one embodiment the sensor quantizer has a spatially-varying arrangement. For instance, in one embodiment using a 1-bit quantizer, a first group of pixel on the sensor has a threshold $Q_1=1$, while other have a higher threshold. Similarly, in embodiment having n-bits quantizers, a plurality of different thresholds can be used for various pixels of the same chip. It is also possible to vary the threshold in time, or depending on lighting conditions.

The two types of pixels can be spatially-interlaced according to a given pattern. It can be shown that in this case, the negative log-likelihood function is still a convex function. All the previous techniques can thus be used.

The arrangement of different types of pixels (with different thresholds) on a given sensor can be designed to achieve an optimal pattern and arrangements of different threshold values, achieving best signal-to-noise ratio.

In order to design an optimal pattern, the following method can be used. If the total number of pixels is N, the maximum threshold value $Q_{max}$, and $a \in [0, a_{max}]$. In an example, the pixels only have two different thresholds $Q_{11}$, and $Q_{12}$, $N_1$ be the number of pixels have threshold $Q_{11}$, and $N_2 = N - N_1$ be the number of pixels have threshold $Q_{12}$. Then the problem is what is the optimal $Q_{11}$, $Q_{12}$, $N_1$, $N_2$ that can maximize $\arg_a \min SNR_{max}(Q_{11}, Q_{12}, N_1, N_2)$? This is equal to solve the problem:

$$Q_{11}, Q_{12}, N_1, N_2 = \underset{Q_{11}, Q_{12}, N_1, N_2}{\operatorname{argmax}} \underset{a}{\operatorname{argmin}} SNR_{max}(Q_{11}, Q_{12}, N_1, N_2)$$

s.t. $a \in [0, a_{max}], Q_{11}, Q_{12} \in [1, Q_{max}], N_1, N_2 \in [0, N], N_1 + N_2 = N,$ where $$SNR_{max}(Q_{11}, Q_{12}, N_1, N_2) = a \sqrt{\frac{R_{Q_1}^2}{N_1 M P_{Q_1}\left(e^{\frac{a}{N_1 M}} - P_{Q_1}\right)} + \frac{R_{Q_2}^2}{N_2 M P_{Q_2}\left(e^{\frac{a}{N_2 M}} - P_{Q_2}\right)}}.$$

Since this optimal pattern design is only done once, during design of a sensor chip, and the variables range is not large, exhaustive search method can be used to solve this optimization problem.

Here we only consider the case that we have two thresholds, more complex cases that have multiple thresholds, or multi-level quantizer can also be done in the same way.

A simple example is given. When $a_{max}=100$, $Q_{max}=9$, and N=100, M=1. Using the above algorithm, the optimal pattern is that $N_1=37$ pixels have $Q_{11}=1$, and $N_2=63$ pixels have $Q_{12}=9$.

Experimental results for 1D and for 2D images have shown that increasing the spatial and/or temporal oversampling factor increase the performance of the apparatus and method when the threshold $Q_1=1$. When the light intensity is large, for small $Q_1$, there is a high probability that the sensor will be saturated, i.e., all the pixel values will be "1". So when the light intensity is large, we need larger thresholds $Q_1$. When the light intensity is small, for large $Q_1$, there is a high probability that the sensor will have all "0" output, which makes the sensor not sensitive to low light intensity. So when the light intensity is small, we need small $Q_1$. If $Q_1>2$, there exists an optimal $(NM)_{opt}$ for a given $\gamma_j$. The NM larger than $(NM)_{opt}$ will have worse performance.

Figure 10:
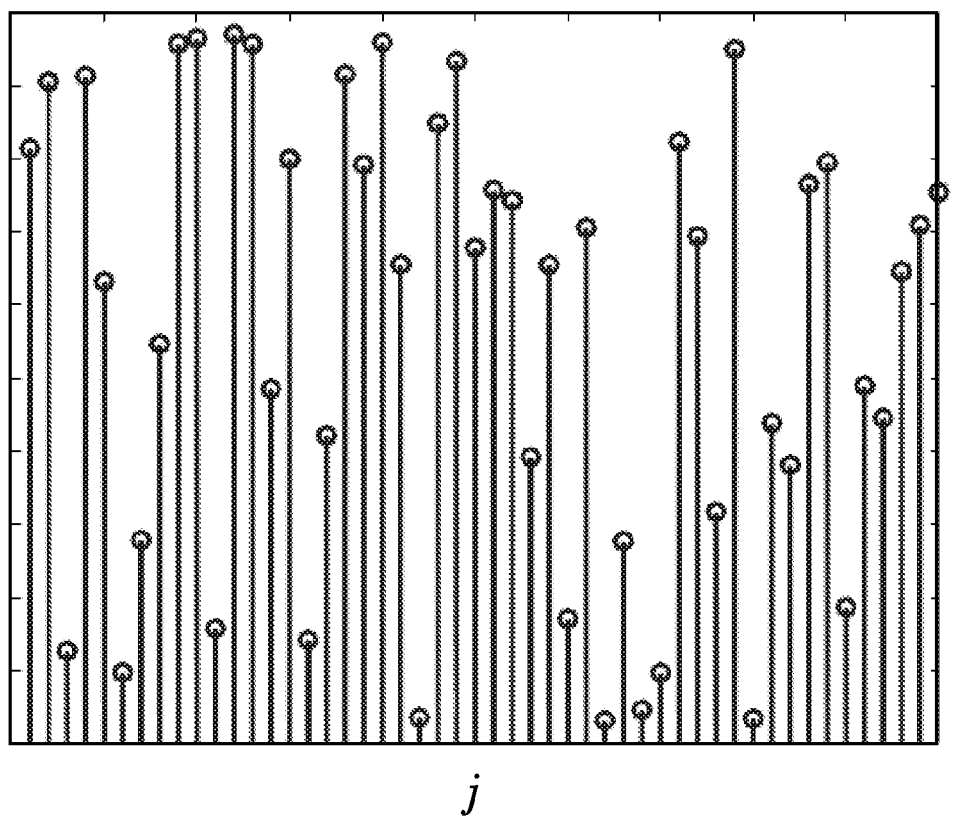
FIG. 10 shows an example of a 1-D synthesized signal $\gamma$.
Figure 11:
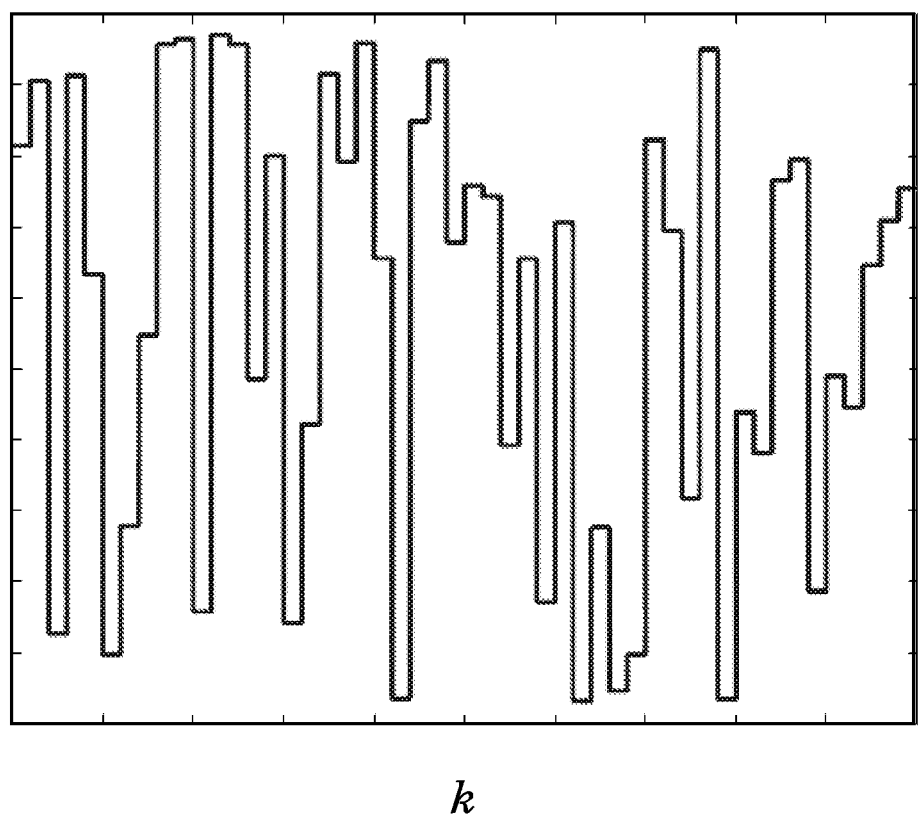
FIG. 11 shows an example of an upsampled and low-pass filtered signal $\tilde{\lambda}$ using an oversampling factor N=100, and an exposure time $\tau=1$.
Figure 12:
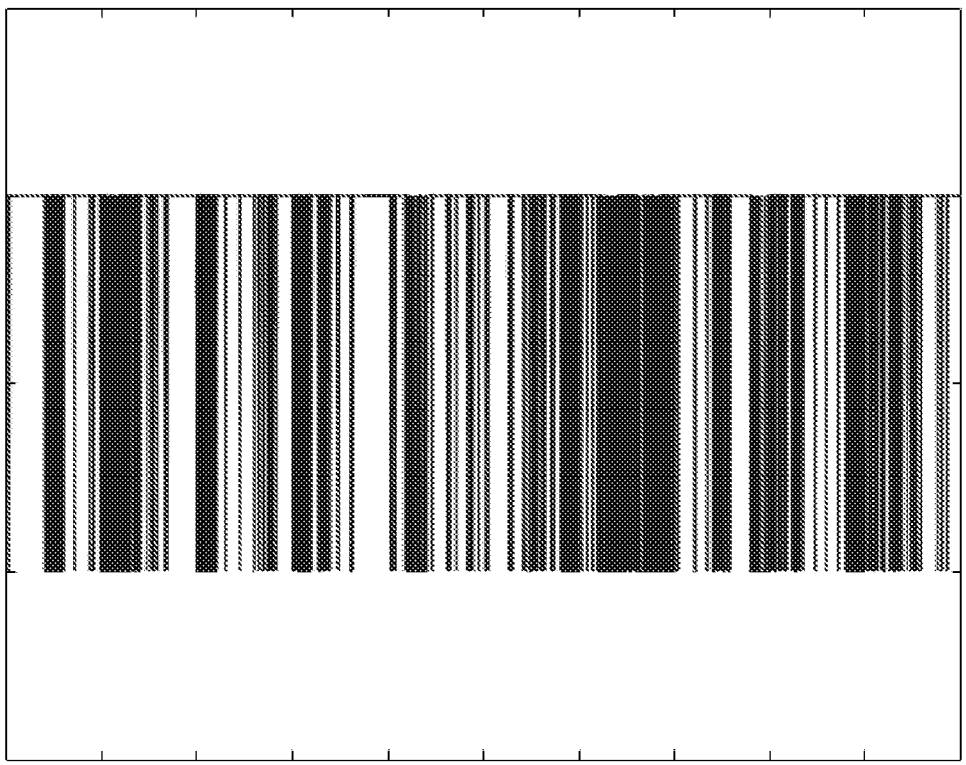
FIG. 12 shows an example of a binary sequence generated by the camera with threshold $Q_1=1$, an oversampling factor N=100, and totally exposure time $\tau=1$.
Figure 13:
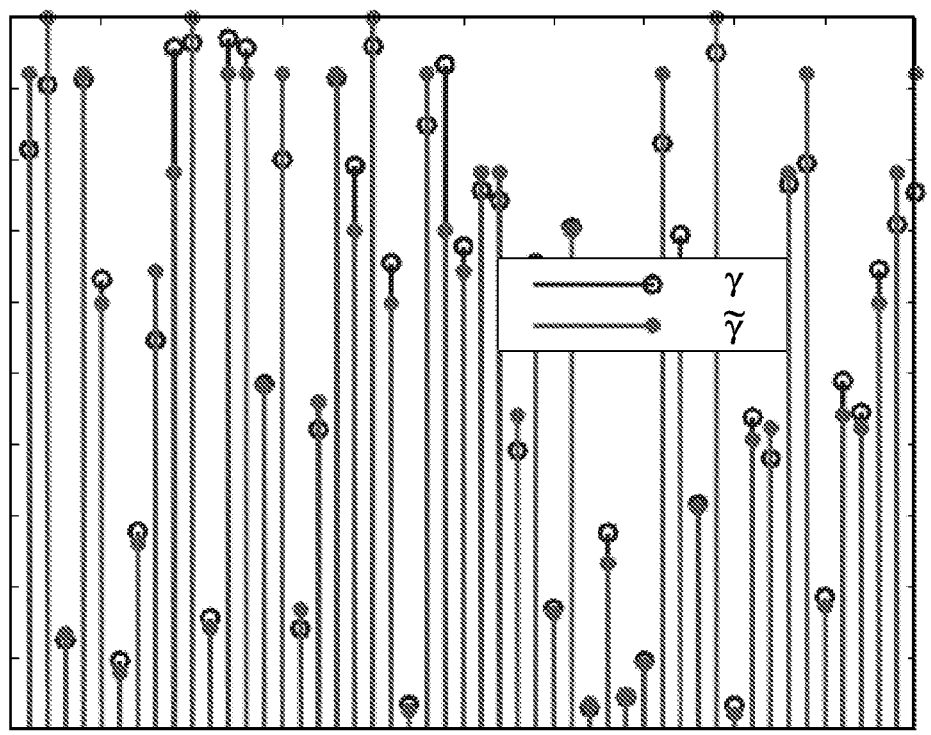
FIG. 13 shows an example of a 1-D synthesized signal $\gamma$, as well as the estimated signal $\hat{\gamma}$, using a threshold a $Q_1=1$, an oversampling factor N=100, a number of exposures M=1, and an exposure time $\tau=1$.
Figure 14:
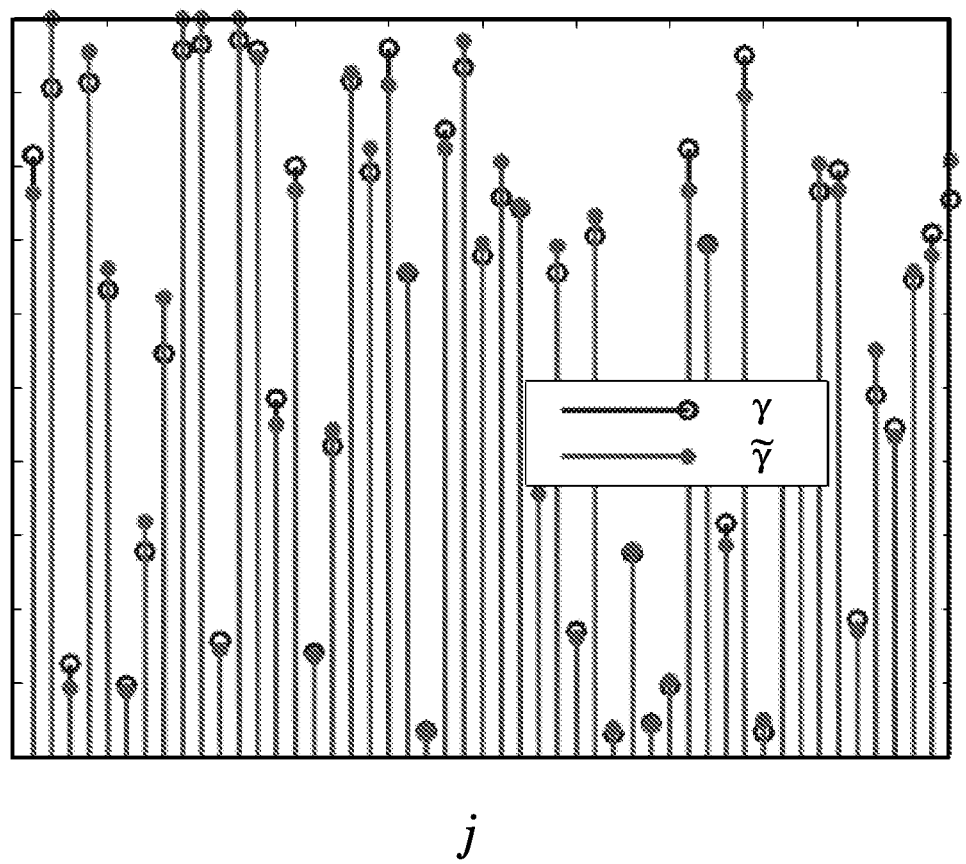
FIG. 14 shows an example of a 1-D synthesized signal $\gamma$, as well as the estimated signal $\hat{\gamma}$, using a threshold $Q_1=1$, an oversampling factor N=20000, a number of exposures M=1 and an exposure time $\tau=1$.

FIG. 10 shows an example of a 1-D synthesized signal γ. FIG. 11 shows an example of an upsampled and low-pass filtered signal $\tilde{\lambda}$, using an oversampling factor N=100, and an exposure time $\tau$=1. FIG. 12 shows an example of a binary sequence generated by the camera/image sensor with threshold $Q_1$=1, an oversampling factor N=100, and total exposure time $\tau$=1. FIG. 13 shows an example of a 1-D synthesized signal $\gamma$, as well as the estimated signal $\hat{\gamma}$, using a threshold $Q_1$=1, an oversampling factor N=100, a number of exposures M=1, and an exposure time of $\tau$=1. FIG. 14 shows an example of a 1-D synthesized signal $\gamma$, as well as the estimated signal $\hat{\gamma}$, using a threshold $Q_1$=1, an oversampling factor N=20000, a number of exposures M=1 and an exposure time $\tau$=1.

The above described methods may be performed by any suitable means capable of performing the operations, such as various hardware and/or software component(s) in a still or video camera, in other image acquisition devices, or in any image processing apparatus, including computer and workstation with suitable image processing applications.

The above described methods and apparatus can be used in consumer image acquisition systems, such as still and video cameras, mobile phone with camera, webcams, etc. Those methods and apparatus are in particular useful for the acquisition of still and video images with a high dynamic range, such as but not limited to high dynamic range photography, low light acquisition (for astronomy or night images), DNA image analysis, chromatography etc.

The various equations and processing steps described in the present application may be performed by a software executed by a general purpose processor or by a digital signal processor (DSP), by an application specific integrated circuit (ASIC), by a field programmable gate array signal (FPGA), by discrete components or any combination thereof. The apparatus may be an image acquisition apparatus, such as a camera comprising a lens, an image processing apparatus in the camera or as a separate equipment (such as a separate computer), or a combination between the two, such as a camera used in combination or sequentially with a computer for acquiring and processing still or video images.

Any steps of a method according to the present application may be embodied in hardware, in a software module executed by a processor, or in a combination of the two. Thus, the invention also relates to a computer program product for performing the operations presented herein. If implemented in software, the functions described may be stored as one or more instructions on a computer-readable medium. Some examples of storage media that may be used include random access memory (RAM), read only memory (ROM), flash memory, EPROM memory, EEPROM memory, registers, a hard disk, a removable disk, other optical disks, or any available media that can be accessed by a computer, a camera or an image acquisition apparatus.

APPENDIX

Gradient of L($\gamma$)
By applying the chain rule, we can show that:

$$\nabla \mathcal{L}(\gamma) = \frac{\partial \mathcal{L}(\gamma)}{\partial \gamma} =$$

$$\frac{\partial \tilde{\lambda}}{\partial \gamma} \frac{\partial \mathcal{L}(\gamma)}{\partial \tilde{\lambda}} = G^T \frac{\partial \sum_{k=1}^{K} \mathcal{L}_k(\gamma)}{\partial \tilde{\lambda}} = G^T \left[ \frac{\partial \mathcal{L}_1(\gamma)}{\partial \tilde{\lambda}_1}, \frac{\partial \mathcal{L}_2(\gamma)}{\partial \tilde{\lambda}_2}, \dots, \frac{\partial \mathcal{L}_K(\gamma)}{\partial \tilde{\lambda}_K} \right]^T$$

The Hessian Matrix of L($\gamma$)

The Hessian matrix of L($\gamma$) is H=$G^T$ AG, where $$A = \begin{pmatrix} \frac{\partial^2 \mathcal{L}_1(\gamma)}{\partial^2 \tilde{\lambda}_1} & 0 & \cdots & 0 \\ 0 & \frac{\partial^2 \mathcal{L}_2(\gamma)}{\partial^2 \tilde{\lambda}_2} & \cdots & 0 \\ \vdots & \vdots & \ddots & \vdots \\ 0 & 0 & \cdots & \frac{\partial^2 \mathcal{L}_K(\gamma)}{\partial^2 \tilde{\lambda}_K} \end{pmatrix}.$$

Proof:
According to the chain rule, $$H = \frac{\partial}{\partial \gamma} \left( \frac{\partial \mathcal{L}(\gamma)}{\partial \gamma} \right)$$

$$= \frac{\partial \tilde{\lambda}}{\partial \gamma} \frac{\partial}{\partial \tilde{\lambda}} \left( \frac{\partial \mathcal{L}(\gamma)}{\partial \gamma} \right)$$

$$= G^T \frac{\partial \left[ \frac{\partial \mathcal{L}_1(\gamma)}{\partial \tilde{\lambda}_1}, \frac{\partial \mathcal{L}_2(\gamma)}{\partial \tilde{\lambda}_2}, \dots, \frac{\partial \mathcal{L}_K(\gamma)}{\partial \tilde{\lambda}_K} \right]^T}{\partial \tilde{\lambda}} G$$

$$= G^T \begin{pmatrix} \frac{\partial^2 \mathcal{L}_1(\gamma)}{\partial^2 \tilde{\lambda}_1} & 0 & \cdots & 0 \\ 0 & \frac{\partial^2 \mathcal{L}_2(\gamma)}{\partial^2 \tilde{\lambda}_2} & \cdots & 0 \\ \vdots & \vdots & \ddots & \vdots \\ 0 & 0 & \cdots & \frac{\partial^2 \mathcal{L}_K(\gamma)}{\partial^2 \tilde{\lambda}_K} \end{pmatrix} G$$

Convexity of L($\gamma$)

To prove L($\gamma$) is a convex function, it is sufficient to show that the Hessian matrix of L($\gamma$), H is positive semidefinite. Looking at the Hessian matrix, we need to prove that $$\frac{\partial^2 L_k(\gamma)}{\partial^2 \tilde{\lambda}_k} \geq 0,$$

$$k = 1, 2, \dots K.$$

Let $$P_Q(x) = \begin{cases} \sum_{q=0}^{Q-1} \frac{x^q}{q!}, & Q \geq 1 \\ 0, & Q \leq 0, \end{cases}$$

$$R_Q(x) = \begin{cases} \frac{x^{Q-1}}{(Q-1)!}, & Q \geq 1 \\ 0, & Q \leq 0, \end{cases}$$

To simply the notation, we use $P_Q$ to indicate the function $P_Q(x)$. The first derivative of $P_Q$ is, $P'_Q = P_{Q-1}$. The first derivative of $R'_Q = R_{Q-1}$. We also have the equation that $P_Q - P_{Q-1} = R_Q$, and $$P_Q(x) = \sum_{q=-\infty}^{Q} R_q(x).$$

When $B_k=0$, $$\frac{\partial \mathcal{L}_k(y)}{\partial \tilde{\lambda}_k} = \frac{-\partial \ln(\mathbb{P}(B_k = 0; \tilde{\lambda}_k))}{\partial \tilde{\lambda}_k} = \frac{-\partial \ln(e^{-\tilde{\lambda}_k} P_{Q_1}(\tilde{\lambda}_k))}{\partial \tilde{\lambda}_k} = 1 - \frac{P'_{Q_1}}{P_{Q_1}} = 1 - \frac{P_{Q_1-1}}{P_{Q_1}} = \frac{R_{Q_1}}{P_{Q_1}}$$

$$\frac{\partial^2 \mathcal{L}_k(\gamma)}{\partial^2 \tilde{\lambda}_k} = \frac{\partial}{\partial \tilde{\lambda}_k}\left(\frac{R_{Q_1}}{P_{Q_1}}\right) = \frac{R'_{Q_1} P_{Q_1} - R_{Q_1} P'_{Q_1}}{P_{Q_1}^2} = \frac{R_{Q_1-1} P_{Q_1} - R_{Q_1} P_{Q_1-1}}{P_{Q_1}^2}$$

If $Q_1=1$, then, $R_{Q_1-1}=0$, $P_{Q_1}=1$, $R_{Q_1}=1$, $P_{Q_1-1}=0$, then $$\frac{\partial^2 L_k(\gamma)}{\partial^2 \tilde{\lambda}_k} = 0 \geq 0,$$

If $Q_1=2$, then, $R_{Q_1-1}=1$, $P_{Q_1}=1+\tilde{\lambda}_k$, $R_{Q_1}=\tilde{\lambda}_k$, $P_{Q_1-1}=1$, then $$\frac{\partial^2 L_k(\gamma)}{\partial^2 \tilde{\lambda}_k} = \frac{1 + \tilde{\lambda}_k - \tilde{\lambda}_k}{P_{Q_1}^2} = \frac{1}{P_{Q_1}^2} \geq 0.$$

If $Q_1 \geq 3$, $$\frac{\partial^2 \mathcal{L}_k(\gamma)}{\partial^2 \tilde{\lambda}_k} = \frac{R_{Q_1-1} P_{Q_1} - R_{Q_1} P_{Q_1-1}}{P_{Q_1}^2}$$

$$= \frac{R_{Q_1-1}}{P_{Q_1}^2}\left(P_{Q_1} - \frac{\tilde{\lambda}_k}{Q_1-1} P_{Q_1-1}\right)$$

$$= \frac{R_{Q_1-1}}{P_{Q_1}^2}\left(\sum_{q=0}^{Q_1-1} \frac{\tilde{\lambda}_k^q}{q!} - \frac{\tilde{\lambda}_k}{Q_1-1} \sum_{q=0}^{Q_1-2} \frac{\tilde{\lambda}_k^q}{q!}\right)$$

$$= \frac{R_{Q_1-1}}{P_{Q_1}^2}\left(\sum_{q=0}^{Q_1-1} \frac{\tilde{\lambda}_k^q}{q!} - \frac{1}{Q_1-1} \sum_{q=0}^{Q_1-2} \frac{\tilde{\lambda}_k^{q+1}}{q!}\right)$$

$$= \frac{R_{Q_1-1}}{P_{Q_1}^2}\left(\sum_{q=0}^{Q_1-1} \frac{\tilde{\lambda}_k^q}{q!} - \frac{1}{Q_1-1} \sum_{q=0}^{Q_1-1} \frac{q\tilde{\lambda}_k^q}{q!}\right)$$

$$= \frac{R_{Q_1-1}}{P_{Q_1}^2} \sum_{q=0}^{Q_1-1}\left(1 - \frac{q}{Q_1-1}\right)\frac{\tilde{\lambda}_k^q}{q!} \geq 0$$

and we also have $R_{Q-1} P_Q - R_Q P_{Q-1} \geq 0$, when $Q \geq 3$ (2).

When $1 \leq B_k = l \leq L-2$, $$\frac{\partial \mathcal{L}_k(y)}{\partial \tilde{\lambda}_k} = \frac{-\partial \ln(\mathbb{P}(B_k = l; \tilde{\lambda}_k))}{\partial \tilde{\lambda}_k} = \frac{-\partial \ln(e^{-\tilde{\lambda}_k}(P_{Q_{l+1}}(\tilde{\lambda}_k) - P_{Q_l}(\tilde{\lambda}_k)))}{\partial \tilde{\lambda}_k}$$

$$= 1 - \frac{P'_{Q_{l+1}} - P'_{Q_l}}{P_{Q_{l+1}} - P_{Q_l}} = 1 - \frac{P_{Q_{l+1}-1} - P_{Q_l-1}}{P_{Q_{l+1}} - P_{Q_l}}$$

$$= \frac{R_{Q_{l+1}} - R_{Q_l}}{P_{Q_{l+1}} - P_{Q_l}}$$

$$\frac{\partial^2 \mathcal{L}_k(\gamma)}{\partial^2 \tilde{\lambda}_k} = \frac{\partial}{\partial \tilde{\lambda}_k}\left(\frac{R_{Q_{l+1}} - R_{Q_l}}{P_{Q_{l+1}} - P_{Q_l}}\right)$$

$$= \frac{(R'_{Q_{l+1}} - R'_{Q_l})(P_{Q_{l+1}} - P_{Q_l}) - (R_{Q_{l+1}} - R_{Q_l})(P'_{Q_{l+1}} - P'_{Q_l})}{(P_{Q_{l+1}} - P_{Q_l})^2}$$

$$= \frac{(R_{Q_{l+1}-1} - R_{Q_l-1})(P_{Q_{l+1}} - P_{Q_l}) - (R_{Q_{l+1}} - R_{Q_l})(P_{Q_{l+1}-1} - P_{Q_l-1})}{(P_{Q_{l+1}} - P_{Q_l})^2}.$$

Here $Q_{l+1}$ should be greater than $Q_l$.

If $Q_l=1$, $Q_{l+1}=2$, then, $R_{Q_{l+1}-1}=R_1=1$, $R_{Q_l-1}=R_0=0$, $P_{Q_{l+1}}=P_2=1+\tilde{\lambda}_k$, $P_{Q_l}=P_1=1$, $$R_{Q_{l+1}} = \tilde{\lambda}_k, R_{Q_l} = R_1 = 1, P_{Q_{l+1}-1} = P_1 = 1, P_{Q_l-1} = 0,$$

$$\frac{\partial^2 \mathcal{L}_k(\gamma)}{\partial^2 \tilde{\lambda}_k} = \frac{(R_{Q_{l+1}-1} - R_{Q_l-1})(P_{Q_{l+1}} - P_{Q_l}) - (R_{Q_{l+1}} - R_{Q_l})(P_{Q_{l+1}-1} - P_{Q_l-1})}{(P_{Q_{l+1}} - P_{Q_l})^2}$$

$$= \frac{1}{(P_{Q_{l+1}} - P_{Q_l})^2} \geq 0$$

If $Q_l=1$, $Q_{l+1} \geq 3$, then, $R_{Q_l-1}=R_0=0$, $P_{Q_l}=P_1=1$, $R_{Q_l}=R_1=1$, $P_{Q_l-1}=0$, $$\frac{\partial^2 \mathcal{L}_k(\gamma)}{\partial^2 \tilde{\lambda}_k} = \frac{R_{Q_{l+1}-1}(P_{Q_{l+1}} - 1) - (R_{Q_{l+1}} - 1)P_{Q_{l+1}-1}}{(P_{Q_{l+1}} - 1)^2}$$

$$= \frac{R_{Q_{l+1}-1} P_{Q_{l+1}} - R_{Q_{l+1}} P_{Q_{l+1}-1} + P_{Q_{l+1}-2}}{(P_{Q_{l+1}} - P_{Q_l})^2}$$

From equation (2), we know that $R_{Q_{l+1}-1} P_{Q_{l+1}} - R_{Q_{l+1}} P_{Q_{l+1}-1} \geq 0$, also $P_{Q_{l+1}-2} \geq 0$, so $$\frac{\partial^2 \mathcal{L}_k(\gamma)}{\partial^2 \tilde{\lambda}_k} = \frac{R_{Q_{l+1}-1} P_{Q_{l+1}} - R_{Q_{l+1}} P_{Q_{l+1}-1} + P_{Q_{l+1}-2}}{(P_{Q_{l+1}} - P_{Q_l})^2} \geq 0$$

If $Q_l \geq 2$, then $Q_{l+1} \geq 3$, $$(R_{Q_{l+1}-1} - R_{Q_l-1})(P_{Q_{l+1}} - P_{Q_l}) - (R_{Q_{l+1}} - R_{Q_l})(P_{Q_{l+1}-1} - P_{Q_l-1}) =$$

$$R_{Q_{l+1}-1} \sum_{q=Q_l+1}^{Q_{l+1}} R_q - R_{Q_l-1} \sum_{q=Q_l+1}^{Q_{l+1}} R_q - R_{Q_{l+1}} \sum_{q=Q_l}^{Q_{l+1}-1} R_q + R_{Q_l} \sum_{q=Q_l}^{Q_{l+1}-1} R_q =$$

$$R_{Q_{l+1}-1}\left(\sum_{q=Q_l+1}^{Q_{l+1}} R_q - \frac{\tilde{\lambda}_k}{Q_{l+1}-1} \sum_{q=Q_l}^{Q_{l+1}-1} R_q\right) +$$

-continued $$R_{Q_l-1}\left(\frac{\tilde{\lambda}_k}{Q_l-1}\sum_{q=Q_l}^{Q_{l+1}-1} R_q - \sum_{q=Q_l+1}^{Q_{l+1}} R_q\right)$$

$$\sum_{q=Q_l+1}^{Q_{l+1}} R_q - \frac{\tilde{\lambda}_k}{Q_{l+1}-1}\sum_{q=Q_l}^{Q_{l+1}-1} R_q = \sum_{q=Q_l+1}^{Q_{l+1}} R_q - \frac{1}{Q_{l+1}-1}\sum_{q=Q_l+1}^{Q_{l+1}-1}\frac{\tilde{\lambda}_k^q}{(q-1)!}$$

$$= \sum_{q=Q_l+1}^{Q_{l+1}} R_q - \frac{1}{Q_{l+1}-1}\sum_{q=Q_l+1}^{Q_{l+1}}\frac{(q-1)\tilde{\lambda}_k^{q-1}}{(q-1)!}$$

$$= \sum_{q=Q_l+1}^{Q_{l+1}}\left(\frac{Q_{l+1}-q}{Q_{l+1}-1}\right)R_q \geq 0$$

$$\frac{\tilde{\lambda}_k}{Q_l-1}\sum_{q=Q_l}^{Q_{l+1}-1} R_q - \sum_{q=Q_l+1}^{Q_{l+1}} R_q = \frac{1}{Q_l-1}\sum_{q=Q_l}^{Q_{l+1}-1}\frac{\tilde{\lambda}_k^q}{(q-1)!} - \sum_{q=Q_l+1}^{Q_{l+1}} R_q$$

$$= \frac{1}{Q_l-1}\sum_{q=Q_l+1}^{Q_{l+1}}(q-1)\frac{\tilde{\lambda}_k^{q-1}}{(q-1)!} - \sum_{q=Q_l+1}^{Q_{l+1}} R_q$$

$$= \sum_{q=Q_l+1}^{Q_{l+1}}\left(\frac{q-Q_l}{Q_l-1}\right)R_q \geq 0$$

$$(R_{Q_{l+1}-1} - R_{Q_l-1})(P_{Q_{l+1}} - P_{Q_l}) - (R_{Q_{l+1}} - R_{Q_l})(P_{Q_{l+1}-1} - P_{Q_l-1}) \geq 0$$

So,
Then, $$\frac{\partial^2 \mathcal{L}_k(\gamma)}{\partial^2 \tilde{\lambda}_k} = \frac{(R_{Q_{l+1}-1} - R_{Q_l-1})(P_{Q_{l+1}} - P_{Q_l}) - (R_{Q_{l+1}} - R_{Q_l})(P_{Q_{l+1}-1} + P_{Q_l-1})}{(P_{Q_{l+1}} - P_{Q_l})^2} \geq 0$$

$$\frac{\partial^2 \mathcal{L}_k(\gamma)}{\partial^2 \tilde{\lambda}_k} \geq 0,$$

Therefore, when $1 \leq B_k = l \leq L-2$,
When $B_k = L-1$, $$\frac{\partial \mathcal{L}_k(\gamma)}{\partial \tilde{\lambda}_k} = \frac{-\partial \ln(\mathbb{P}(B_k = L-1; \tilde{\lambda}_k))}{\partial \tilde{\lambda}_k}$$

$$= \frac{-\partial \ln(1 - e^{-\tilde{\lambda}_k} P_{Q_{L-1}}(\tilde{\lambda}_k))}{\partial \tilde{\lambda}_k}$$

$$= 1 - \frac{e^{\tilde{\lambda}_k} - P'_{Q_{L-1}}}{e^{\tilde{\lambda}_k} - P_{Q_{L-1}}}$$

$$= 1 - \frac{e^{\tilde{\lambda}_k} - P_{Q_{L-1}-1}}{e^{\tilde{\lambda}_k} - P_{Q_{L-1}}}$$

$$= -\frac{R_{Q_{L-1}}}{e^{\tilde{\lambda}_k} - P_{Q_{L-1}}}$$

-continued $$\frac{\partial^2 \mathcal{L}_k(\gamma)}{\partial^2 \tilde{\lambda}_k} = \frac{\partial}{\partial \tilde{\lambda}_k}\left(-\frac{R_{Q_{L-1}}}{e^{\tilde{\lambda}_k} - P_{Q_{L-1}}}\right)$$

$$= -\frac{R'_{Q_{L-1}}(e^{\tilde{\lambda}_k} - P_{Q_{L-1}}) - R_{Q_{L-1}}(e^{\tilde{\lambda}_k} - P'_{Q_{L-1}})}{(e^{\tilde{\lambda}_k} - P_{Q_{L-1}})^2}$$

$$= -\frac{R_{Q_{L-1}-1}(e^{\tilde{\lambda}_k} - P_{Q_{L-1}}) - R_{Q_{L-1}}(e^{\tilde{\lambda}_k} - P_{Q_{L-1}-1})}{(e^{\tilde{\lambda}_k} - P_{Q_{L-1}})^2}$$

If $Q_{L-1} = 1$, then, $R_{Q_{L-1}-1} = 0$, $P_{Q_{L-1}} = 1$, $R_{Q_{L-1}} = 1$, $P_{Q_{L-1}-1} = 0$, thus, $$\frac{\partial^2 \mathcal{L}_k(\gamma)}{\partial^2 \tilde{\lambda}_k} = \frac{e^{\tilde{\lambda}_k}}{(e^{\tilde{\lambda}_k} - P_{Q_{L-1}})^2} \geq 0$$

If $Q_{L-1} \geq 2$, $$\frac{\partial^2 \mathcal{L}_k(\gamma)}{\partial^2 \tilde{\lambda}_k} = -\frac{R_{Q_{L-1}-1}}{(e^{\tilde{\lambda}_k} - P_{Q_{L-1}})^2}\left(\sum_{q=Q_{L-1}+1}^{+\infty} R_q - \frac{\tilde{\lambda}_k}{Q_{L-1}-1}\sum_{q=Q_{L-1}}^{+\infty} R_q\right)$$

$$= -\frac{R_{Q_{L-1}-1}}{(e^{\tilde{\lambda}_k} - P_{Q_{L-1}})^2}\left(\sum_{q=Q_{L-1}+1}^{+\infty} R_q - \frac{1}{Q_{L-1}-1}\sum_{q=Q_{L-1}}^{+\infty}\frac{\tilde{\lambda}_k^q}{(q-1)!}\right)$$

$$= -\frac{R_{Q_{L-1}-1}}{(e^{\tilde{\lambda}_k} - P_{Q_{L-1}})^2}\left(\sum_{q=Q_{L-1}+1}^{+\infty} R_q - \frac{1}{Q_{L-1}-1}\sum_{q=Q_{L-1}+1}^{+\infty}\frac{(q-1)\tilde{\lambda}_k^{q-1}}{(q-1)!}\right)$$

$$= -\frac{R_{Q_{L-1}-1}}{(e^{\tilde{\lambda}_k} - P_{Q_{L-1}})^2}\sum_{q=Q_{L-1}+1}^{+\infty}\frac{Q_{L-1}-q}{Q_{L-1}-1}R_q \geq 0$$

So, when $$B_k = L-1, \frac{\partial^2 \mathcal{L}_k(\gamma)}{\partial^2 \tilde{\lambda}_k} \geq 0.$$

From the above, we can make the conclusion that for any $$B_k, \frac{\partial^2 \mathcal{L}_k(\gamma)}{\partial^2 \tilde{\lambda}_k} \geq 0.$$

So the Hessian matrix of $L(\gamma)$ is positive semidefinite, it is a convex function.

Gradient of $L(\gamma)$

The gradient of $L(\gamma)$ is $$\nabla \tilde{\mathcal{L}}(\gamma) = \frac{1}{M}G^T \sum_{m=1}^{M}\left[\frac{\partial \tilde{\mathcal{L}}_{m1}(\gamma)}{\partial \tilde{\lambda}_1}, \frac{\partial \tilde{\mathcal{L}}_{m2}(\gamma)}{\partial \tilde{\lambda}_2}, \ldots, \frac{\partial \tilde{\mathcal{L}}_{mK}(\gamma)}{\partial \tilde{\lambda}_K}\right]^T.$$

Proof:
According to the chain rule, $$\nabla \tilde{\mathcal{L}}(\gamma) = \frac{\partial \tilde{\mathcal{L}}(\gamma)}{\partial \gamma}$$

$$= \frac{\partial \tilde{\lambda}}{\partial \gamma} \frac{\partial \tilde{\tilde{\lambda}}}{\partial \tilde{\lambda}} \frac{\partial \tilde{\mathcal{L}}(\gamma)}{\partial \tilde{\tilde{\lambda}}}$$

$$= \frac{1}{M} G^T \frac{\partial \sum_{m=1}^{M} \sum_{k=1}^{K} \tilde{\mathcal{L}}_{mk}(\gamma)}{\partial \tilde{\tilde{\lambda}}}$$

$$= \frac{1}{M} G^T \sum_{m=1}^{M} \left[ \frac{\partial \tilde{\mathcal{L}}_{m1}(\gamma)}{\partial \tilde{\tilde{\lambda}}_1}, \frac{\partial \tilde{\mathcal{L}}_{m2}(\gamma)}{\partial \tilde{\tilde{\lambda}}_2}, \ldots, \frac{\partial \tilde{\mathcal{L}}_{mK}(\gamma)}{\partial \tilde{\tilde{\lambda}}_K} \right]^T.$$

Hessian Matrix of L($\gamma$)

The Hessian matrix of $$\tilde{\mathcal{L}}(\gamma) \text{ is } \tilde{H} = \frac{1}{M^2} G^T \tilde{A} G,$$

where, $$\tilde{A} = \begin{pmatrix} \sum_{m=1}^{M} \frac{\partial^2 \tilde{\mathcal{L}}_{m1}(\gamma)}{\partial^2 \tilde{\tilde{\lambda}}_1} & 0 & \cdots & 0 \\ 0 & \sum_{m=1}^{M} \frac{\partial^2 \tilde{\mathcal{L}}_{m2}(\gamma)}{\partial^2 \tilde{\tilde{\lambda}}_2} & \cdots & 0 \\ \vdots & \vdots & \ddots & \vdots \\ 0 & 0 & \cdots & \sum_{m=1}^{M} \frac{\partial^2 \tilde{\mathcal{L}}_{mK}(\gamma)}{\partial^2 \tilde{\tilde{\lambda}}_K} \end{pmatrix}.$$

Proof:
According to the chain rule, $$\tilde{H} = \frac{\partial}{\gamma} \left( \frac{\partial \tilde{\mathcal{L}}(\gamma)}{\partial \gamma} \right)$$

$$= \frac{\partial \tilde{\lambda}}{\partial \gamma} \frac{\partial \tilde{\tilde{\lambda}}}{\partial \gamma} \frac{\partial}{\partial \tilde{\tilde{\lambda}}} \left( \frac{\partial \tilde{\mathcal{L}}(\gamma)}{\partial \gamma} \right)$$

$$= \frac{1}{M^2} G^T \frac{\partial \sum_{m=1}^{M} \left[ \frac{\partial \tilde{\mathcal{L}}_{m1}(\gamma)}{\partial \tilde{\tilde{\lambda}}_1}, \frac{\partial \tilde{\mathcal{L}}_{m2}(\gamma)}{\partial \tilde{\tilde{\lambda}}_2}, \ldots, \frac{\partial \tilde{\mathcal{L}}_{mK}(\gamma)}{\partial \tilde{\tilde{\lambda}}_K} \right]^T}{\partial \tilde{\tilde{\lambda}}} G$$

$$= \frac{1}{M^2} G^T \begin{pmatrix} \sum_{m=1}^{M} \frac{\partial^2 \tilde{\mathcal{L}}_{m1}(\gamma)}{\partial^2 \tilde{\tilde{\lambda}}_1} & 0 & \cdots & 0 \\ 0 & \sum_{m=1}^{M} \frac{\partial^2 \tilde{\mathcal{L}}_{m2}(\gamma)}{\partial^2 \tilde{\tilde{\lambda}}_2} & \cdots & 0 \\ \vdots & \vdots & \ddots & \vdots \\ 0 & 0 & \cdots & \sum_{m=1}^{M} \frac{\partial^2 \tilde{\mathcal{L}}_{mK}(\gamma)}{\partial^2 \tilde{\tilde{\lambda}}_K} \end{pmatrix} G$$

Convexity of L($\gamma$)

To prove L($\gamma$) is a convex function, it is sufficient to show that the Hessian matrix of L($\gamma$), $\tilde{H}$ is positive semidefinite. Looking at the Hessian matrix, we need to prove that $$\frac{\partial^2 \tilde{\mathcal{L}}_{mK}(\gamma)}{\partial^2 \tilde{\tilde{\lambda}}_K} \geq 0,$$

m=1, 2, . . . , M, k=1, 2, . . . , K. This can be proved in the similar way as prove $$\frac{\partial^2 L_k(\gamma)}{\partial^2 \tilde{\lambda}_k} \geq 0,$$

k=1, 2, . . . , K.

The invention claimed is:

1. A method for image acquisition and conversion comprising
    spatially low-pass filtering a received light intensity field by an acquisition lens,
    producing from at least a portion of said spatially low-pass filtered light intensity field a spatially up-sampled image using an image sensor, the up-sampled image having a first spatial resolution finer than the Rayleigh criterion for the acquisition lens by at least a factor of 2, the up-sampled image comprising samples of a first bit depth, and
    converting said up-sampled image into a multi-level image having samples with a second spatial resolution lower than said first resolution, the samples in the multi-level image having a second bit depth greater than the first bit depth, wherein said converting comprises determining, based on a model of the spatial low-pass filtering of the acquisition lens, an estimate ($\hat{\gamma}$) of at least a portion of the received light intensity field at a plurality of the samples within the multi-level image.

2. The method of claim 1, wherein said spatially up-sampled image is produced with a gigapixel image sensor, wherein the first bit depth is one bit.

3. The method of claim 1, wherein said determining an estimate ($\hat{\gamma}$) of the received light intensity field uses a maximum likelihood estimator (MLE) to compute said estimate.

4. The method of claim 3, wherein the maximum likelihood estimator solves a convex function optimization using a Newton method or modified Newton method.

5. The method of claim 3, wherein a polyphase representation of the signals and/or operators is used to reduce the computing time of determining the estimate of the received light intensity field.

6. The method of claim 3, wherein determining the estimate of the received light intensity field using the maximum likelihood estimator comprises performing a conjugate gradients method.

7. The method of claim 1, wherein the spatially up-sampled image comprises multiple temporal samples of the spatial low-pass filtered light intensity field.

8. The method of claim 1, wherein producing the up-sampled image using the image sensor comprises samples representing various light sensitivity thresholds.

9. An image acquisition apparatus comprising:
a lens having a spatial low-pass filtering function, the lens applying the spatial low-pass filtering function to a received light intensity field;
an image sensor to receive at least a portion of the spatially low-pass filtered light intensity field, the image sensor having a first spatial resolution finer the Rayleigh criterion for the acquisition lens by at least a factor of 2, the image sensor producing a spatially up-sampled image comprising samples with a first bit depth, and;
an image processor to convert said spatially up-sampled image into a multi-level image having samples with a second spatial resolution lower than said first resolution, the samples in the multi-level image having a second bit depth greater than the first bit depth, the image processor converting the spatially up-sampled image based on a model of the spatial low-pass filtering function of the acquisition lens to produce an estimate of at least a portion of the received light intensity field at a plurality of the samples within the multi-level image.

10. The image acquisition apparatus of claim 9, wherein said first bit depth is one bit.

11. The image acquisition apparatus of claim 9, wherein said image processor computes an estimate of the received light intensity field using a maximum likelihood estimator (MLE) arranged for computing said estimate.

12. The image acquisition apparatus of claim 11, wherein the image processor comprises a filter bank to implement the maximum likelihood estimator, the filter bank arranged for determining the gradient and the multiplication of a vector and Hessian matrix of a negative log-likelihood function.

13. The image acquisition apparatus of claim 9, wherein the spatially up-sampled image comprises multiple temporal samples of the spatial low-pass filtered light intensity field.

14. The image acquisition apparatus of claim 9, wherein said apparatus is a still or video camera.

15. The image acquisition apparatus of claim 9, wherein with the samples of the spatially up-sampled image represent various light sensitivity thresholds.

16. A non-transitory computer readable medium comprising instructions which, when executed by at least one processor, cause the at least one processor to:
convert a spatially up-sampled acquisition image to a multi-level image, the acquisition image acquired with an acquisition lens, the acquisition image having a first spatial resolution finer than the Rayleigh criterion for the acquisition lens by at least a factor of 2, the acquisition image comprising samples of a first bit depth, the multi-level image having samples with a second spatial resolution lower than the first resolution and with a second bit depth greater than the first bit depth,
wherein said converting step determines, based on a model of the point spread function of the acquisition lens, an estimate of at least a portion of a light intensity field received by the acquisition lens at a plurality of the samples within the multi-level image.

17. The non-transitory computer readable medium of claim 16, wherein said converting step implements a maximum likelihood estimation (MLE) method.

18. The non-transitory computer-readable medium of claim 17, wherein the spatially up-sampled acquisition image comprises multiple temporal samples of the light intensity field as received after passing through the acquisition lens.

19. The non-transitory computer-readable medium of claim 16, wherein said instructions are executable by a processor in a camera.

20. A method for reconstructing an image from measurements taken by an image sensor, comprising:
filtering with a lens and then spatially up-sampling with an image sensor a light intensity field to obtain spatially oversampled light intensity values having a first bit depth, and
processing said spatially oversampled light intensity values in order to generate a reconstructed image having lower spatial resolution and a higher bit depth than the spatially oversampled light intensity values, using maximum likelihood estimation based on a model of the point spread function of the lens to estimate the light intensity field.

21. The method of claim 20, wherein said processing exploits the convexity of the negative log-likelihood function of said maximum likelihood estimation when the threshold of said image sensor is normalized to one.

22. The method of claim 20, wherein said image sensor is a binary image sensor that produces a binary image.

23. A system for reconstructing an image from binary measurements comprising:
an up-sampling image sensor to produce, from at least a port on of a spatially low-pass filtered light intensity field received via an acquisition lens, a spatially up-sampled image having a first spatial resolution finer than the Rayleigh criterion for the acquisition lens by at least a factor of 2, the up-sampled image comprising samples of a first bit depth; and
a circuit to generate a reconstructed image by converting said up-sampled image into a multi-level image having samples with a second spatial resolution lower than said first resolution, said converting including determining, based on a model of the spatial low-pass filtering of the acquisition lens, an estimate ($\hat{\gamma}$) of at least a portion of the received light intensity field at a plurality of the samples within the multi-level image.

* * * * *